(12) United States Patent
Ma et al.

(10) Patent No.: US 7,944,930 B2
(45) Date of Patent: May 17, 2011

(54) MEMORY BUFFERING WITH FAST PACKET INFORMATION ACCESS FOR A NETWORK DEVICE

(75) Inventors: Sha Ma, San Jose, CA (US); Earl T. Cohen, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 717 days.

(21) Appl. No.: 11/298,965

(22) Filed: Dec. 9, 2005

(65) Prior Publication Data

US 2007/0133581 A1    Jun. 14, 2007

(51) Int. Cl.
*H04L 12/28* (2006.01)
*H04L 12/54* (2006.01)
(52) U.S. Cl. ............... 370/395.7; 370/412; 370/429
(58) Field of Classification Search .............. 370/412
See application file for complete search history.

(56) References Cited

U.S. PATENT DOCUMENTS

| | | | |
|---|---|---|---|
| 6,799,229 B1* | 9/2004 | Lin | 710/52 |
| 7,050,440 B2* | 5/2006 | Colmant et al. | 370/395.1 |
| 2003/0174699 A1* | 9/2003 | Van Asten et al. | 370/389 |
| 2005/0080953 A1* | 4/2005 | Oner et al. | 710/52 |
| 2007/0002863 A1* | 1/2007 | Black | 370/394 |
| 2007/0061693 A1* | 3/2007 | Wickeraad | 714/801 |
| 2007/0071034 A1* | 3/2007 | Fleming | 370/474 |
| 2007/0127480 A1* | 6/2007 | Chen et al. | 370/392 |

\* cited by examiner

*Primary Examiner* — Kevin C Harper
*Assistant Examiner* — John Blanton
(74) *Attorney, Agent, or Firm* — Schwegman, Lundberg & Woessner, P.A.

(57) ABSTRACT

A networking device employing memory buffering in which a first memory is logically configured into blocks, and the blocks are logically configured into particles, where a second memory is configured to mirror the first memory in which a fixed number of bits in the second memory are allocated for each particle in the first memory so that scheduling and datagram lengths of packets stored in the first memory may be stored in the second memory. Other embodiments are described and claimed.

21 Claims, 5 Drawing Sheets

$302 \quad 304$
$(S_0, E)$

FIG. 3

$402 \quad 406 \qquad\qquad 410$
$(S_0, X) \ (S_1, X) \ (S_2, X) \ldots (S_8, X) \ (0, X) \ (0, X) \ (0, E)$
$\quad\ \ 404 \quad\ \ 408 \qquad\qquad\qquad\qquad\qquad\qquad\ \ 412$

FIG. 4

$\qquad\qquad\qquad\qquad 502 \qquad\qquad 504$
$(S_0, X) \ (S_1, X) \ldots (S_8, X) \ (D_0, X) \ (D_1, X) \ldots (D_9, X) \ (0, E)$
$\qquad\qquad\qquad\qquad\qquad\qquad\qquad\qquad\qquad\qquad 506$

MEMORY BUFFERING WITH FAST PACKET INFORMATION ACCESS FOR A NETWORK DEVICE

FIELD

Embodiments of the present invention relate to memory buffering, and more particularly, to memory buffering of data packets for a networking device.

BACKGROUND

Communication and computing devices, such routers, switches, and personal computers, for example, implement various functions, such as packet buffering, reassembly, and scheduling, where data packets are received from a port, and depending upon header information contained in the data packets, are transferred to some other port. In order to do this job, the data packets are stored in queues. Consequently, the data packets associated with these queues are stored in a memory buffer and then at a later time are recalled. To properly schedule the various queues for subsequent transmission, the lengths of the data packets in a queue are generally desired. The data packet lengths could be stored on-chip with the scheduling processor chip, where the data packets are stored in an off-chip memory and accessed with pointers. These pointers can be configured to point to the data packets as well as their associated packet lengths, so that the processor can determine which lengths belong to which data packets. However, storing packet length information on-chip may consume a large amount of die area. In addition, storing the pointers on-chip also may consume a large amount of die area. Consequently, other techniques for accessing packet length information and pointers are desirable.

BRIEF DESCRIPTION OF THE DRAWINGS

FIGS. 3, 4, 5, 6, and 7 illustrate an embodiment for encoding packet lengths.

DESCRIPTION OF EMBODIMENTS

Figure 1:
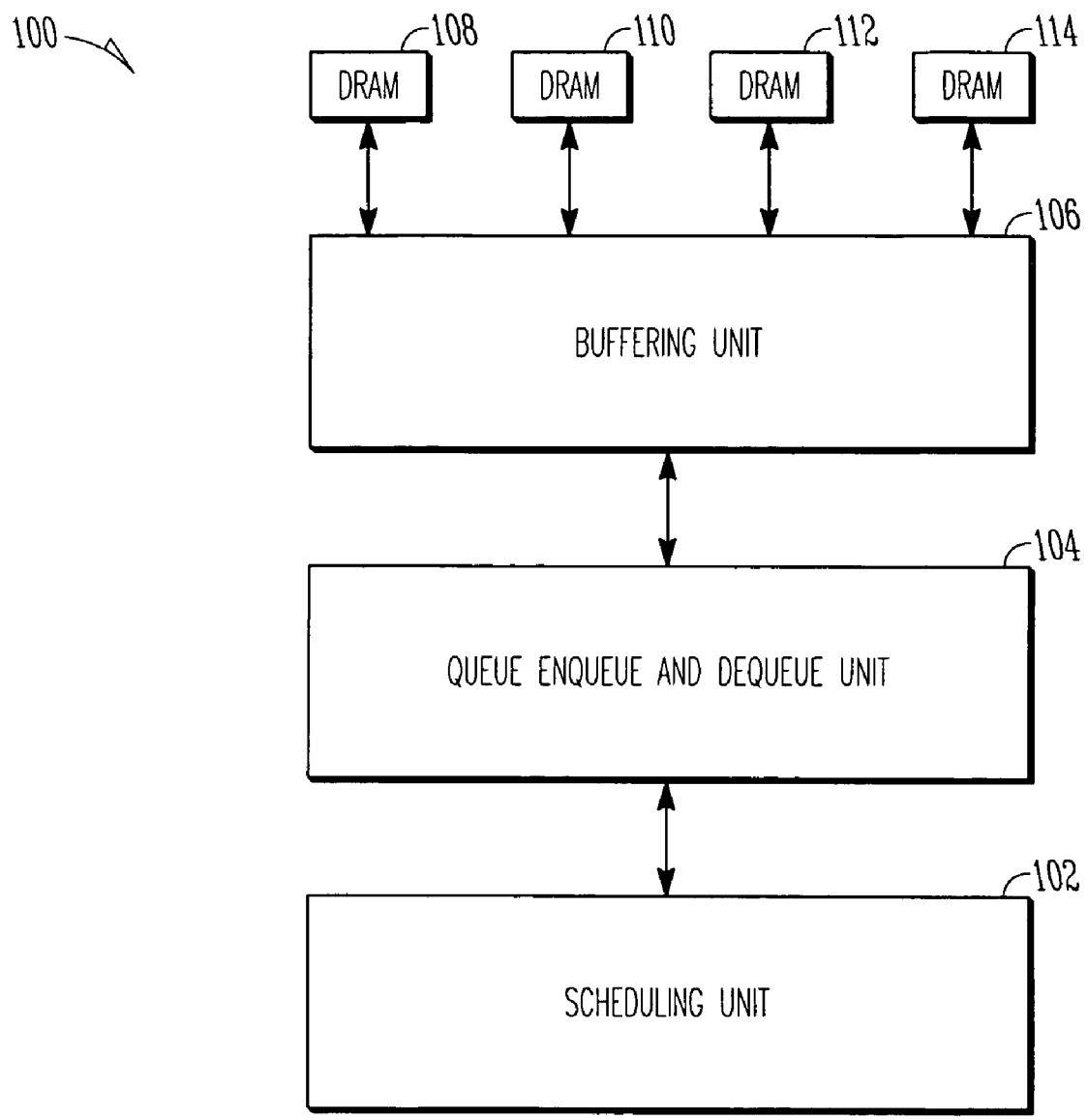
FIG. 1 is a high level diagram of a portion of the architecture of a networking device, such as a router, in accordance with an embodiment of the present invention.

FIG. 1 illustrates in a simple manner a high level diagram of the architecture of a portion of network processor 100 in accordance with an embodiment. Network processor 100 is part of a networking device, such as a router, for example. Three functional units are shown in FIG. 1, scheduling unit 102, queue enqueue and dequeue unit 104, and buffering unit 106. Coupled to buffering unit is DRAM (Dynamic Random Access Memory), which in FIG. 1 are shown as DRAM units 108, 110, 112 and 114. Buffering unit 106 controls how memory is accessed. It also handles enqueue and dequeue data path and serves as a channel controller for the external DRAMs 108 through 114. Queue enqueue and dequeue unit 104 controls how memory is arranged into queues and serves as a transaction controller for various clients needing to access the packet buffer memory. Packet buffer memory refers to DRAM 108 through 114. Queue, enqueue and dequeue unit 104 also handles control functions related to enqueuing and dequeuing, and various queue management activities including packet length tracking per queue and free list management to indicate which portions of the buffer memory are free.

The functional unit shown in FIG. 1 may reside on one integrated circuit or several integrated circuits. Any of these integrated circuits may be application specific integrated circuits or they may be programmable processor cores.

Scheduling unit 102 controls the order in which packet stored in queues are retrieved from memory. To efficiently perform this task, scheduling unit 102 needs various information associated with packets, such as scheduling lengths and datagram lengths. The datagram length of a data packet refers to the length of the actual data contained in the packet. The scheduling length is the length of the resulting packet after various header bits are added or deleted. For example, for transmitting onto a network using the TCP/IP protocol, various header bits will be added to the data packet after it leaves the network processor, thereby increasing the length of the packet that is actually transmitted. Conversely, a packet arriving at a router may have header bits attached which are given to the network processor, but which are not to be accounted for in the scheduling of queues. In this case, the datagram length of the received packet may be larger than its scheduling length. Accordingly, there may be a scheduling length associated with each data packet in addition to a datagram length.

These header bits include routing information. As a result, the scheduling length of a packet will in general be longer than its datagram length.

Figure 2:
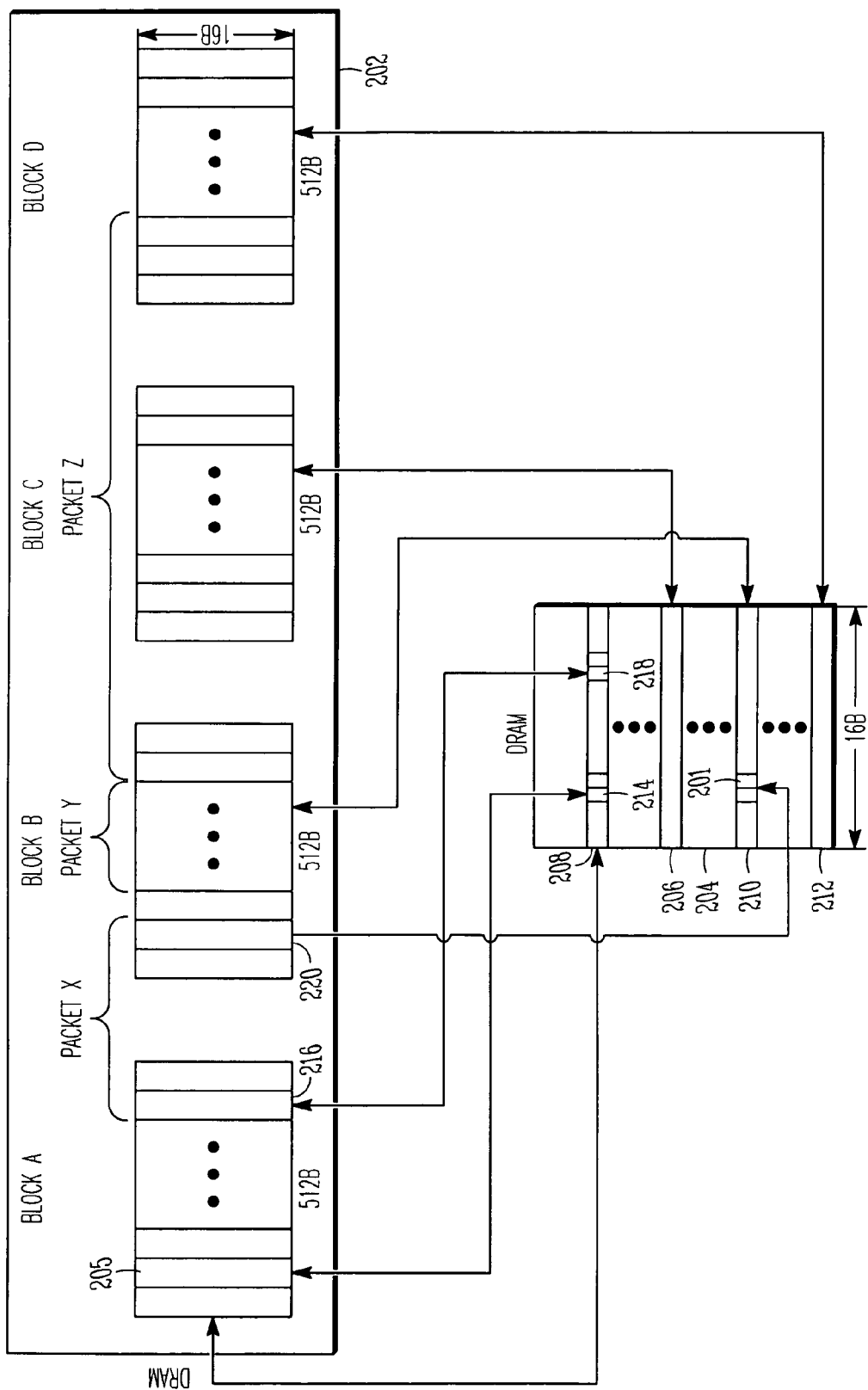
FIG. 2 illustrates an embodiment for configuring memory.

Memory buffering refers to the way in which data packets are stored in memory. Buffering unit 106 receives memory requests from queue enqueue and dequeue unit 104 and writes or reads information such as data packets to DRAM. In one embodiment, DRAM 108, 110, 112 and 114 are logically configured into various blocks. An embodiment logical configuration is illustrated in FIG. 2, where memory 202 may comprise various discrete DRAMs, such as a portion or combination of portions of memory included in some or all of DRAM 108, 110, 112 and 114 in FIG. 1. For simplicity, FIG. 2 shows memory 202 configured into four memory blocks: block A, block B, block C and block D. In practice, there will be many memory blocks. Data stored in a block may have contiguous memory addresses. In the particular example of FIG. 2, each block has a memory size of 512 bytes, but of course, memory may be configured using other block sizes. Usually, memory is configured where each block has a memory size equal to some power of two.

Each block is logically configured into particles. For example, particle 205 in block A is the second particle within block A. In the particular example of FIG. 2, each particle has a storage size of 16 bytes, where 16 bytes is the read and write burst length of memory 202. That is, for a given read or write transaction, 16 bytes are rapidly transferred via a memory bus. In other embodiments, the particle size may be larger or smaller than 16 bytes, and may or may not correspond to a DRAM burst size.

A queue comprises a number of data packets. For example, in FIG. 2, three packets are indicated: packet X, packet Y and packet Z. When the first packet in the queue is stored in memory, it may not necessarily reside in the first particle of a block. For example, in FIG. 2, we see that packet X does not begin at the beginning of block A. Part of packet X is stored in block A with its remaining portion stored in block B. After the end of packet X, packet Y is entirely contained within block B. Packet Z begins in block B after packet Y, it is also stored in block C, and finally ends in block D.

For dequeuing, queue enqueue and dequeue unit 104 is responsible for first returning stored packet length information to scheduling unit 102. Queue enqueue and dequeue unit 104 may later receive a read request in the form of a packet handle, a combination of queue number and data length to be read, to fetch previously scheduled packet data from memory. If packet data length were stored with the packets themselves, then to obtain the packet length, both the packet data and its associated packet length would have to be read from memory. This would be inefficient, particularly when DRAM is used for the packet buffer.

Embodiments of the present invention employ a second memory, memory 204 in FIG. 2, which is mirrored to memory 202. Memory 204 is used to stored packet length information corresponding to data packets stored in memory 202. Packet length information is stored in memory 204 by allocating for each particle in memory 202 a fixed number of storage bits in memory 204. In one embodiment, memory 204 may be an on-chip or off-chip SRAM. In another embodiment, memory 204 comprises one or more various discrete DRAM, such as a portion or combination of portions of memory included in some or all of DRAM 108, 110, 112, and 114. That is, some portion of DRAM 108, 110, 112, and 114 is configured as memory 202, and another portion is configured as memory 204.

Memory 204 is logically configured into partitions, such as 206. The size of these partitions may correspond to the read and write burst length of memory 204. For example, FIG. 2 indicates that the memory partition size for memory 204 is 16 bytes, the same as the read and write burst length of memory 202. However, if two bits in memory 204 were allocated for each particle in memory 202, then in another embodiment, the partition size may be 64 bits, which provides two bits per particle for each of the 32 16-byte particles in a 512-byte block of memory 202.

For each block in memory 202, there corresponds a partition of memory in memory 204. Consequently, a pointer list comprising pointers to blocks of memory in memory 202 may also point to partitions of memory in memory 204. In this way, memory 204 mirrors memory 202. For example, for the particular embodiment of FIG. 2, associated with block A is partition 208, associated with block B is partition 210, associated with block C is partition 206, and associated with block D is partition 212.

In the particular embodiment of FIG. 2, two bits of storage are allocated for each particle. For example, particle 205 in block A correspond to two bits of storage labeled as 214 in memory 204. Similarly, particle 216 in block A corresponds to two bits of storage labeled as 218 in memory 204. The particular encoding scheme will be described later. Regardless of the particular encoding scheme used, by associating a fixed number of storage bits in memory 204 to each particle in memory 202, the data length information for a particular packet may be efficiently obtained.

For example, if queue enqueue and dequeue unit 104 requires the data length of packet X, then, because it has a head pointer associated with that particular queue, it can access the partition in memory 204 that corresponds to, or mirrors, the block in memory 202 in which the head of the queue is stored. More particularly, queue enqueue and dequeue unit 104 has a pointer that can point to block A and, correspondingly, that pointer will also point to memory portion 208. In this way, queue enqueue and dequeue unit 104 can start to decode the packet length associated with packet X by reading memory 204, and without having to access memory 202. However, because a portion of packet X also resides in block B, it may happen that some of its length information is stored in another partition in memory 204. For example, the particle labeled 220 in block B may correspond to the two bits of storage labeled 221 in memory 204. Accordingly, to decode the entire packet length associated with packet X, it may be necessary to not only read data within partition 208, but also within partition 210 of memory 204. However, this information is available to the queue enqueue and dequeue unit 104 because it will have a list of pointers linking the various blocks associated with the queue, and because memory 204 mirrors 202, that same list of pointers may be used to walk through memory 204.

In some embodiments, there is a separate head pointer for dequeuing length information, as opposed to the actual packet data. This allows the length information for multiple packets to be dequeued before the packet data is dequeued, which is important for scheduling. For example, when a scheduler is determining the order in which to send packet data, generally it requires only the length of a packet and which queue the packet is from, not the actual contents of the packet.

An embodiment for encoding packet lengths, such as a scheduling length and a datagram length, is now described, although from the description it should be clear how various other encoding schemes may be employed, and how other packet-specific information may also be encoded and stored. Scheduling length is encoded in terms of a scheduling unit. For example, a scheduling unit may be 32 bytes. That is, 32 bytes is the granularity in specifying a scheduling length. For each particle that part of a data packet is stored in, a length-encoding bit is stored. In some embodiments, up to nine bits of scheduling length are stored because nine bits is sufficient to encode the scheduling length in 32-byte units for a 10 KB packet. The bits may be stored in reverse order so that the least significant bit is stored first, as this keeps the least-significant bit in the same place for a small packet as for a larger packet.

For example, consider the very simple case in which a data packet occupies only one particle. In FIG. 3, this encoding is represented by two bits labeled 302 and 304. Bit 302 indicates the scheduling length in some scheduling unit, such as 32 bytes. In this example, because the data packet is assumed to occupy only one particle, the first bit stored in position 302 will be a "1", assuming that the scheduling length of the packet should be 32 bytes. (The data packet could have a scheduling length of zero in some embodiments, particularly where the scheduling length is rounded or averaged among successive packets.) The bit labeled as symbol "E" in 304 indicates an end bit. (In practice, either a binary bit "0" or "1" is chosen to represent the "E" bit. For convenience, we use the symbol "E".) An end bit indicates the last particle associated with a data packet. By counting the number of bits in memory 204 associated with a data packet in memory 202, its datagram length, in particle lengths, is immediately determined. In the particular case of FIG. 3, the data packet has a datagram length of only one particle because the second bit in the two-bit representation is the "E" bit.

As another example, consider a 12-particle packet. The encoding for this is represented in FIG. 4. Here, the least significant bit of the scheduling length is stored in bit position 402, the next bit of the scheduling length is in bit position 406, and finally the most significant bit of the scheduling length is stored in bit position 410. The symbol "X" in the second bit position of a two-bit representation indicates that the corresponding particle is not the last particle for storing the associated data packet. Simply stated, an "X" is the complement of the symbol "E", so that if a "1" is used for an "E" bit, then a "0" is used for an "X" bit. For example, as bits 404 and 408 are read, the queue enqueue and dequeue unit 104 knows that the particles associated with bits 404 and 408 are not the last particle for the associated data packet. Not until bit position 412 is reached and an end bit ("E") is seen will the datagram length be decoded. Accordingly, from FIG. 4, it is seen that the bit representation $[s_8, s_7, \ldots, s_0]$ represents the scheduling length associated with the data packet. Remember that this scheduling length is in terms of some fixed scheduling unit. For example, if the bit representation were the binary number [000001001], and if the granularity (fixed unit) were 32 bytes, then scheduling length would be 9×32=288 bytes.

Because the data packet is assumed to be 12 particles for the example of FIG. 4, there are three particles left to encode. The end of the data packet is simply encoded by including the end bit "E" in bit location 412. Thus, for queue enqueue and dequeue unit 104 to decode the scheduling and datagram length associated with the data packet represented by FIG. 4, it would have a pointer that would point to a partition in memory 204 which mirrors that portion of memory 202 storing the data packet, and from memory 204 it could quickly read the information illustrated in FIG. 4 to decode the scheduling length and the datagram length of the packet.

Continuing with the description of an embodiment, if the data packet is sufficiently long, then its datagram length may also be stored in a fashion similar to how its scheduling length is stored. In an embodiment where the datagram length is encoded in units of 16-bytes particles and the longest packet is 10 KB, 10 bits are allocated for such an encoding scheme. For example, suppose a data packet is 20 particles in length. FIG. 5 illustrates an encoding scheme for this case. As before, the scheduling length may be encoded as discussed with respect to FIG. 4. After encoding the scheduling length, there are now 10 more particles which can be encoded into a datagram length. For example, the first bit, or least significant bit, of the datagram length is stored in bit position 502 in FIG. 5, and the most significant bit of the datagram length is stored in bit position 504. After reading 10 particles to encode the datagram length, there is still one particle left encode, and accordingly, an end bit "E" may be stored in bit location 506. The bit representation $[D_9, D_8, \ldots, D_0]$ represents the datagram length of the packet in units of particles. (In the example of FIG. 5, there is redundancy in encoding the datagram length because there is also the end bit 506 which indicates the end of a packet.)

For data packets stored in 21 or more particles, a different encoding scheme may be employed where the first bit in the encoding is a type bit, designating one of two possible types. If the first bit is "0" indicating a first type, then a scheduling length and datagram length is stored as discussed in the previous examples, along with an end bit "E" to denote the last particle. But, if the datagram length is 30 or more particles, then the type bit is set to "1" to indicate a second type, whereby more information is stored. Particularly, not only is the scheduling length and datagram length encoded, but also a pointer to the last block in which that particular data packet is stored is also encoded. For the particular memory size considered here in which the blocks are 512 bytes in size and the total buffer size is 256 megabytes, a 19-bit pointer is required to point to the various blocks. Accordingly, to encode the last block pointer, 10 particle length pairs are sufficient.

For example, if the data packet has a datagram length between 21 and 29 particles, inclusive, then an encoding scheme is represented in FIG. 6, where the first bit labeled 602 indicates the encoding type of the length information. In this example, the encoding type is the bit "0" to indicate that this data packet has a datagram length of between 21 and 29 particles, inclusive. For this type, the pointer to the last block is not encoded. The last encoding indicated by bit 604 in FIG. 6 shows the use of an end bit "E" to indicate the end of the data packet.

An example of encoding for a data packet stored among 30 or more particles is illustrated in FIG. 7, where bit 702 is "1" to indicate that this encoding type is a second kind of length information, namely, that the particle length for the data packet is 30 or greater. Its scheduling length and datagram length are encoded as discussed above, but in addition to these lengths, also a 19-bit pointer is stored, where the most significant bit representing this pointer is stored in bit position 704, and the least significant bit representing this pointer is stored in bit position 706. An advantage of this scheme is that now queue enqueue and dequeue unit 104 may easily determine where to find the encoding of the scheduling and datagram length for the next data packet in the queue. This is so because queue enqueue and dequeue unit 104 has available to it a pointer to the last block in which the previous packet has been stored, and because of the fact that memory 204 mirrors memory 202, it also knows where to find the lengths associated with this last block, and the next packet, if any, will immediately follow the current one.

As can be seen from the above description, an advantage of this encoding scheme is that the length information for a packet may be found in a fixed number of particles, which for one embodiment is no more than 30 particles. Hence, retrieving the length information for a packet is efficient, and does not require following multiple pointers. Note that the use of this type of encoding speeds up decoding because the type is known from the first particle, and it is known a priori that there are no E bits among the first 21 particles. This encoding type, however, could also be determined without dedicating a type bit, but instead by determining that there are no E bits in the first 20 particles and that the datagram length was greater than or equal to 29. This is more complex, however, as it involves decoding the datagram length and comparing its value.

Figure 8:
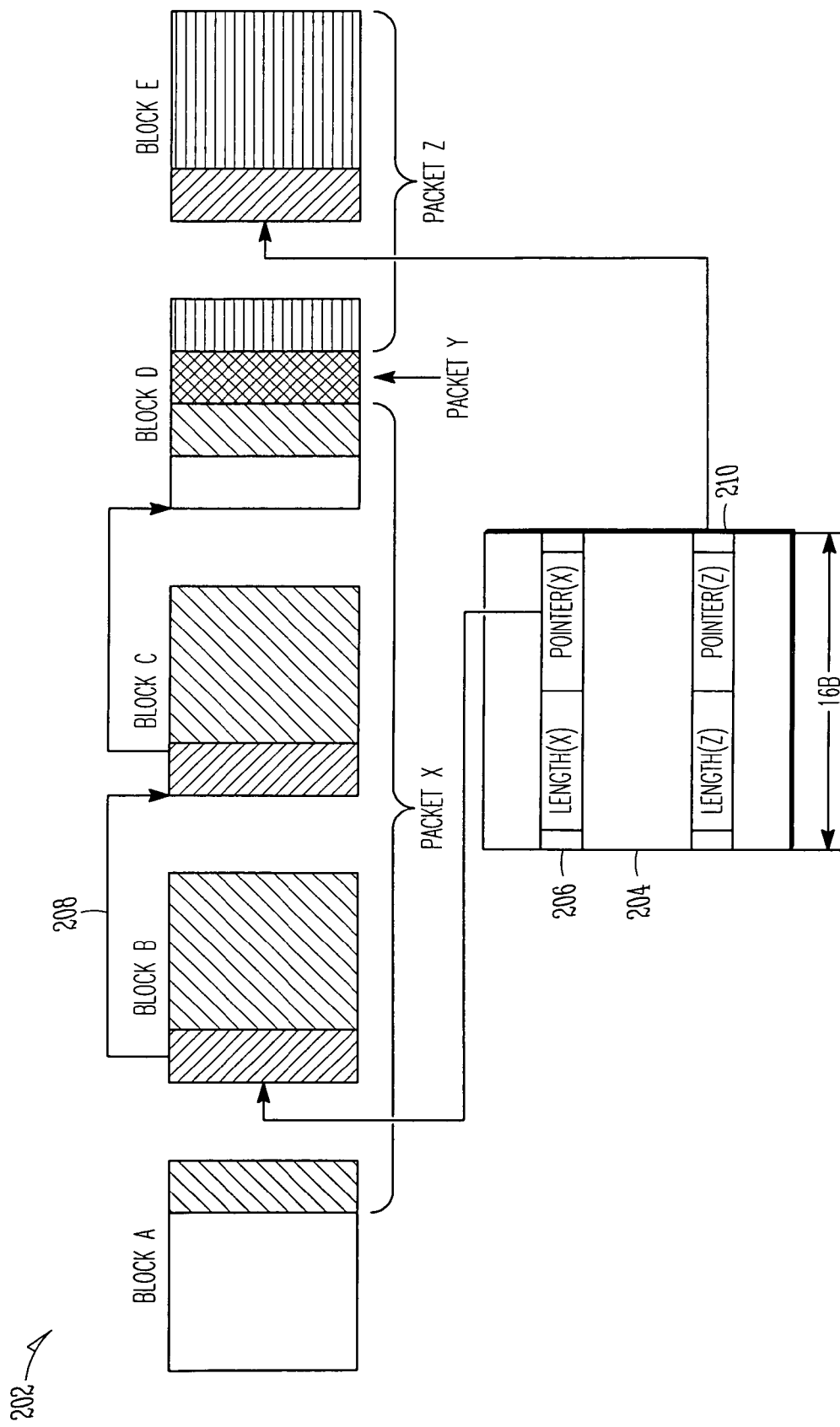
FIG. 8 illustrates another embodiment for configuring memory.

Additional information may be stored with the scheduling lengths and datagram lengths. For example, a queue is a linked list of blocks, so to link the blocks in a queue it is necessary to have pointers to point from one block to the next. These pointers may be stored in memory 204 along with the associated scheduling and datagram lengths. Specifically, in some embodiments, the first next block pointer is stored in memory 204. This may be made clear from the example illustrated in FIG. 8. In FIG. 8, blocks A, B, C, D and E are shown. For simplicity, the particles making up the blocks are not shown. Sections of the blocks corresponding to a particular packet are cross-hatched. For example, hatch marks in block A, block B, block C and block D indicate that packet X is stored among these blocks. Hatch marks in block D indicate that packet Y is stored entirely within block D, and hatch marks in blocks D and E indicate that packet Z is stored among these two blocks. Now consider the beginning of packet X which begins in block A. If the data in packet X is to be read, then buffering unit 106 must set up a read to block A and also to block B to get the next portion of packet X. To speed up this read, it would be desirable to obtain a pointer to block B before the start of the read of packet X from block A has completed. This may be accomplished by storing a pointer to block B, termed the first next block pointer. This pointer may be stored in memory 204 in FIG. 8.

Consider the memory partition in memory 204 labeled as 206. In this embodiment, the memory partition is 16 bytes (128 bits) wide, which may correspond to a read and write burst of memory 204. Memory partition 206 corresponds to block A. Stored within partition 206 are the scheduling and datagram lengths associated with block A, containing at least the start of the length information for packet X, designated as "Length(X)" in FIG. 8 for simplicity. Along with these lengths is stored a pointer designated as pointer(X) in FIG. 8.

This is the first next block pointer which points to block B, the second block among which packet X is stored. Consequently, with this scheme, when packet X is to be read from the memory buffer, not only are its scheduling and datagram lengths quickly available, but also the first next block pointer is available so that the read from block B can be set up. The cost for this extra information may be more bits stored per particle in memory 204 compared to storing only the length information.

Once packet X is read from block B, from FIG. 8 it is seen that block C needs to be read. However, in this case the pointer to block C may be stored in the low memory address (first accessed) portion of block B. This is indicated by the arrow labeled 208. The hatched portion of block B at the beginning of arrow 208 stores the pointer to block C. In this way, the pointers to the rest of the blocks may be stored in the same DRAM that the data packets are stored in. The fetching over the next-block pointer to block C overlaps the reading of packet data from block B. Because of this, in general there is no loss in performance when fetching these next-block pointers.

Note that in FIG. 8, block C stores the pointer to block D, where packet X ends. Consequently, a pointer need not be stored in the low memory address portion of block D.

Referring to packet Y in FIG. 8, because packet Y is entirely contained within block D, a pointer to another block is not required to read this packet. However, packet Z is stored among block D and block E. So, a first next block pointer is stored along with its associated lengths. This is indicated in partition 210 in FIG. 8, where the first next block pointer for packet Z is stored and points to block E where the rest of packet Z may be read.

To simplify the drawing of FIG. 8, note that all of the length information associated with packet X, "length(X)", is shown as entirely contained within partition 206, and that all of the length information associated with packet Z, "length(Z)", is shown as entirely contained within partition 210. However, depending upon the length of a packet and where it begins in a block, its length information may be spread among two partitions in memory 204. For example, suppose packet Z begins near the end of block D so that the number of particles of packet Z in block D is not enough to decode its length information. Based upon the previous description of an embodiment, the partition in memory 204 corresponding to block E would also be read to obtain the rest of the length information for packet Z, and thereby two reads from memory 204 are performed to decode the length information for packet Z.

Performing two reads to decode the length information of packet Z may not present a problem if packet Z were sufficiently long. However, if packet Z is a very short packet, then two reads from memory 204 may take longer than reading packet Z from memory 202. If this case of two reads for a short packet were to occur back-to-back, then performance may suffer.

However, for some embodiments, there may be unused memory for each partition in memory 204. For example, for block sizes of 512B having 32 particles, using a length coding scheme of 2 bits per particle will use 8B of memory in a partition of memory 204. If a 19-bit first-block pointer is also stored in a partition, then there will still be 5B of storage available if a partition is 16B in size. This 5B of storage may be used to store the packet length associated with a small packet that begins near the end of a block and finishes in the next block. With this scheme, the length information of a 20 particle-size packet may be stored within 5B if a 2 bits per particle encoding scheme is utilized. (For larger sized packets, the penalty of two reads to obtain packet length information is not a bottleneck because of the time it takes to read packets of that size.)

As discussed earlier, memory 202 and memory 204 may include portions or combination of portions of various DRAMs. For example, in some embodiments, memory 204 may be combined with memory 202 as follows: Because in a previously described embodiment the low memory address portion of each block in memory 202 is used to store a pointer to the next block, this same area of each block may also store the length (and other) information contained in memory 204. This has an advantage of using one set of memory devices for both the packet data, length information, and other information, and of storing all the non-data information for a block in a single particle where it can be accessed with a single read or write operation. Accordingly, memory 204 and 202 may be viewed as logical partitions of one or more DRAM devices.

Various modifications may be made to the disclosed embodiments without departing from the scope of the invention as claimed below.

What is claimed is:

1. A packet-processing apparatus, comprising:
   a first memory;
   a second memory;
   a first functional unit to logically configure the first memory into blocks, wherein the blocks are logically configured into particles, and to logically configure the second memory into partitions so that there is a one-to-one correspondence between the blocks and the partitions, wherein for each particle in a block there corresponds a fixed number of storage bits in the partition in the second memory corresponding to the block; and
   a second functional unit configured to:
   store a packet in at least one particle in the first memory;
   store a packet information corresponding to the packet in at least some of the storage bits in the second memory corresponding to the at least one particle, each of the storage bits which correspond to the at least one particle in which the packet is stored being associated with the packet, so that the number of storage bits which are associated with the packet being indicative of a length of the packet;
   store a type bit in at least some of the storage bits in the second memory corresponding to the at least one particle, type bit designating whether the at least one particle in which the packet is stored number more than a threshold number of particles; and
   when the at least one particle in which the packet is stored number more than the threshold number of particles, store in the second memory a pointer to a last block in the first memory in which the packet is stored.

2. The apparatus as set forth in claim 1, wherein the first memory has a read and write burst size, wherein each particle has a storage capacity equal to the burst size.

3. The apparatus as set forth in claim 2, wherein the second memory has a read and write burst size equal to the burst size of the first memory.

4. The apparatus as set forth in claim 1, further comprising a first processor and a second processor, wherein the first functional unit resides in the first processor and the second functional unit resides in the second processor.

5. The apparatus as set forth in claim 1, wherein for each packet x stored in more than one block so that packet x is stored in at least one particle in a first block and at least one particle in a second block, a first next-block pointer corresponding to packet x is stored in at least some of the storage bits in the second memory corresponding to the first block.

6. The apparatus as set forth in claim 1, wherein two storage bits in the second memory are allocated for each particle in the first memory.

7. The apparatus as set forth in claim 1, the packet information defining a datagram, wherein for a packet x having an end stored in a last particle, if the packet x is stored in at least one particle numbering less than or equal to a fixed number of particles, then the processor stores an end bit in one of the storage bits corresponding to the last particle of packet x so that the end bit uniquely defines the datagram length associated with packet x.

8. The apparatus as set forth in claim 1, wherein for a packet x stored in at least one particle, the processor stores a sequence of bits in at least some of the storage bits in the second memory corresponding to the at least one particle such that the sequence of bits represents a scheduling length associated with packet x.

9. The apparatus as set forth in claim 8, wherein the packet x has an end stored in a last particle, wherein if the at least one particle are in number less than or equal to a fixed number of particles, then the processor stores an end bit in one of the storage bits corresponding to the last particle of packet x, so that the end bit uniquely defines a datagram length associated with packet x.

10. A method to buffer packets in a first memory and to store corresponding packet information in a second memory, the method comprising:
    logically configuring the first memory into blocks;
    logically configuring the blocks into particles;
    logically configuring the second memory into partitions so that blocks and partitions are in one-to-one correspondence;
    logically configuring the partitions in such a way that a fixed number of storage bits in the second memory are allocated for each particle in the first memory;
    storing a packet in at least one particle in a block in the first memory;
    storing a corresponding packet information in at least some of the corresponding fixed number of storage bits in a partition in the second memory corresponding to the block, each of the storage bits which correspond to the at least one particle in which the packet is stored being associated with the packet, so that the number of storage bits which are associated with the packet being indicative of a length of the packet;
    store a type bit designating whether the at least one particle in which the packet is stored number more than a threshold number of particles; and
    when the at least one particle in which the packet is stored number more than the threshold number of particles, store in the second memory a pointer to a last block in the first memory in which the packet is stored.

11. The method as set forth in claim 10, further comprising:
    reading and writing to the first memory with a first burst size, wherein each particle has a storage capacity equal to the burst size.

12. The method as set forth in claim 11, further comprising:
    reading and writing to the second memory with a second burst size, wherein each partition has a storage capacity equal to the second burst size.

13. The method as set forth in claim 12, wherein the first and second burst sizes are equal to each other.

14. The method as set forth in claim 10, further comprising:
    storing in the second memory a first next-block pointer for a packet stored in at least a first block and a second block, where the first next-block pointer is stored in a partition corresponding to the first block.

15. The method as set forth in claim 10, wherein for a packet x having an end stored in a last particle, if the packet x is stored in at least one particle numbering less than or equal to a fixed number of particles, the method further comprising:
    storing an end bit in one of the storage bits in the second memory corresponding to the last particle of packet x, so that the end bit uniquely defines a datagram length associated with packet x.

16. The method as set forth in claim 10, wherein for a packet x stored in at least one particle, the method further comprising:
    storing a sequence of bits in the storage bits in the second memory corresponding to at least a portion of particles belonging to the at least one particle such that the sequence of bits represent a scheduling length associated with packet x.

17. The method as set forth in claim 16, wherein if packet x has an end stored in a last particle, and if the at least one particle are in number less than or equal to a fixed number of particles, the method further comprising:
    storing an end bit in one of the storage bits in the second memory corresponding to the last particle of packet x, so that the end bit uniquely defines a datagram length associated with packet x.

18. A packet-processing apparatus, comprising:
    a first memory;
    a second memory;
    a first functional unit to logically configure the first memory into blocks, the blocks being logically configured into particles, and to logically configure the second memory into partitions so that there is a one-to-one correspondence such that for each block there corresponds a partition; and
    a second functional unit configured to:
        store a packet in at least a first block and a second block in the first memory;
        store a first next-block pointer associated with the packet to point to the second block, where the corresponding first next-block pointer is in a partition in the second memory corresponding to the first block in the first memory; and
        store a type bit in the second memory designating whether the particles in which the packet is stored number more than a threshold number of particles.

19. The apparatus as set forth in claim 18, wherein if the packet is stored in at least a third block, the processor stores a second next-block pointer in the second block to point to the third block.

20. The apparatus as set forth in claim 18, wherein the second functional unit is further to store in the second memory a pointer to a last block in the first memory in which the packet is stored, wherein the particles in which the packet is stored number more than the threshold number of particles.

21. Apparatus to buffer packets in a first memory and to store corresponding packet information in a second memory, the apparatus comprising:
    means for logically configuring the first memory into blocks;
    means for logically configuring the blocks into particles;
    means for logically configuring the second memory into partitions so that blocks and partitions are in one-to-one correspondence;
    means for logically configuring the partitions in such a way that a fixed number of storage bits in the second memory are allocated for each particle in the first memory;

means for storing a packet in at least one particle in a block in the first memory;

means for storing a corresponding packet information in at least some of the corresponding fixed number of storage bits in a partition in the second memory corresponding to the block, each of the storage bits which correspond to the at least one particle in which the packet is stored being associated with the packet, so that the number of storage bits which are associated with the packet being indicative of a length of the packets;

means for storing a type bit designating whether the at least one particle in which the packet is stored number more than a threshold number of particles; and means for storing in the second memory, when the at least one particle in which the packet is stored number more than the threshold number of particles, a pointer to a last block in the first memory in which the packet is stored.

\* \* \* \* \*

UNITED STATES PATENT AND TRADEMARK OFFICE
CERTIFICATE OF CORRECTION

| | |
|---|---|
| PATENT NO. | : 7,944,930 B2 |
| APPLICATION NO. | : 11/298965 |
| DATED | : May 17, 2011 |
| INVENTOR(S) | : Sha Ma et al. |

It is certified that error appears in the above-identified patent and that said Letters Patent is hereby corrected as shown below:

In column 11, line 10, in Claim 21, delete "packets;" and insert -- packet; --, therefor.

Signed and Sealed this
Twenty-sixth Day of July, 2011

David J. Kappos
*Director of the United States Patent and Trademark Office*